(12) United States Patent
Bergau

(10) Patent No.: US 8,320,752 B1
(45) Date of Patent: Nov. 27, 2012

(54) DRAIN ATTACHMENT FOR A WATER HEATER

(76) Inventor: Michael G. Bergau, Cape Coral, FL (US)

( * ) Notice: Subject to any disclaimer, the term of this patent is extended or adjusted under 35 U.S.C. 154(b) by 521 days.

(21) Appl. No.: 12/378,725

(22) Filed: Feb. 19, 2009

Related U.S. Application Data

(60) Provisional application No. 61/066,250, filed on Feb. 19, 2008.

(51) Int. Cl.
*A47J 27/00* (2006.01)

(52) U.S. Cl. .......... 392/441; 392/449; 222/108; 222/89

(58) Field of Classification Search ................... None
See application file for complete search history.

(56) References Cited

U.S. PATENT DOCUMENTS

| | | | | |
|---|---|---|---|---|
| 42,252 A * | 4/1864 | Curtis | | 47/52 |
| 64,524 A * | 5/1867 | Gore | | 47/52 |
| 225,762 A * | 3/1880 | Pierce | | 47/52 |
| 472,306 A * | 4/1892 | Mitchell | | 47/52 |
| 925,681 A * | 6/1909 | Christian | | 392/443 |
| 930,361 A * | 8/1909 | McGettigan | | 47/52 |
| 1,543,104 A * | 6/1925 | Hoag | | 604/345 |
| 2,483,979 A * | 10/1949 | Morrill | | 219/437 |
| 2,601,039 A * | 6/1952 | Livingstone | | 222/109 |
| 3,782,611 A * | 1/1974 | Wanderer | | 222/569 |
| 4,270,231 A * | 6/1981 | Zint | | 4/144.1 |
| 4,714,053 A * | 12/1987 | Perry | | 122/382 |
| 4,813,383 A * | 3/1989 | Daugirda | | 122/159 |
| 5,152,843 A * | 10/1992 | McDonald et al. | | 134/22.1 |
| 5,406,935 A * | 4/1995 | Cinotto | | 122/13.01 |
| 5,609,124 A * | 3/1997 | Leclerc | | 122/388 |
| 5,921,207 A * | 7/1999 | DiSalvo et al. | | 122/388 |
| 5,943,984 A * | 8/1999 | Lannes | | 122/392 |

* cited by examiner

*Primary Examiner* — Thor Campbell
(74) *Attorney, Agent, or Firm* — William E. Noonan

(57) ABSTRACT

An attachment tool for draining water from a water heater during replacement of the heating element includes an annular mounting member that has an elongate channel attached thereto. The channel has a pair of aligned notches formed proximate a distal end of channel for supporting a bucket or other container. The mounting member is disposed peripherally about the tapping of a heating element receptacle. When the heating element is removed from the receptacle, water drains from the receptacle and through the channel into the bucket supported thereon.

8 Claims, 5 Drawing Sheets

DRAIN ATTACHMENT FOR A WATER HEATER

RELATED APPLICATION

This application claims the benefit of U.S. Provisional Patent Application Ser. No. 61/066,250 filed Feb. 19, 2008.

FIELD OF THE INVENTION

This invention relates to an appliance that is removably attached to the tapping of an electric water heater for diverting or draining water that is discharged when the heating element is removed from the water heater tank.

BACKGROUND OF THE INVENTION

Electric water heaters utilize a replaceable heating element that is typically attached threadably to the tank of the water heater. Periodically, the heating element must be changed. Although the manufacturers of most electric water heaters recommend that all of the water be drained from the tank before the heating element is changed, this step can take a considerable period of time to complete. Where a professional plumber is performing the task, the resulting cost can be quite high. Accordingly, to expedite changing the heating element, most plumbers have traditionally just removed the element without first draining the tank. This normally results in a relatively modest amount of water (e.g. 1-2 cups) draining out of the tank through the heating element receptacle. Although the amount of water discharged is limited, it still presents a mess that must be cleaned.

Normally, the person changing the heating element can use a sponge or a rag to catch and absorb the water that has leaked from the water heater. In the past, the heating element was usually mounted within a recessed compartment in the wall of the water heater case. It was relatively easy for the plumber or other person changing the heating element to insert a sponge or rag in the compartment between the tank and outside case, which would adequately catch the leaking water and limit the resulting mess. However, newer water heaters utilize a sealed compartment between the tank and the case of the water heater. The heating element compartment is effectively sealed by a foam dam and there is little or no room to insert a sponge or rag. In such cases, when the heating element is removed, most if not all of the water leaking from the opening runs downwardly along the outside wall of the water heater. This invariably creates a more annoying mess, which the plumber or other person performing the element changing task must address. In addition, under any circumstances, it is undesirable to expose even the limited amount of water that leaks from the heating element receptacle to the nearby electrical components and wiring of the water heater.

SUMMARY OF THE INVENTION

It is therefore an object of the present invention to provide a tool that effectively and efficiently drains and collects the water that normally leaks from a water heater when the heating element is changed.

It is a further object of this invention to provide a plumbing tool that virtually eliminates any mess caused by changing the heating element of a water heater, and which therefore allows the heating element to be changed more quickly, efficiently and less expensively.

It is a further object of this invention to provide a drain attachment that may be utilized effectively with virtually all conventional types of water heaters including those that employ either a sealed or open compartment for holding the water heater element.

It is a further object of this invention to provide a drain attachment that remains securely fixed to the tapping or other structure surrounding the receptacle of a water heater's heating element so that the heating element can be changed quickly, efficiently and without creating a mess.

It is a further object of this invention to provide a water heater drain attachment that is securely attached to the tapping of the water heater's heating element in a quick, easy and reliable manner.

It is a further object of this invention to provide a drain attachment for water heaters that allows water discharged from the heater when the heating element is changed to be effectively collected without creating a mess and without requiring any cleanup on the part of the person changing the element.

It is a further object of this invention to provide a drain attachment for a water heater that diverts the water effectively away from the electrical components and wiring of the water heater so that potential electrical problems with the water heater are avoided.

This invention results from a realization that water may be drained more effectively from a water heater when the heating element is changed by removably attaching an inclined drain channel to the water heater and in communication with the receptacle or opening through which the heating element is removed. Such a channel would divert water away from the water heater when the heating element is removed. A pail or other container attached to a distal end of the channel can be attached to the channel to effectively collect the water that is discharged through the heating element receptacle.

This invention features a drain attachment for an electric water heater having a tank with an outlet or receptacle formed therein for receiving a replaceable heating element. The outlet is surrounded by a flange or tapping. The attachment includes a mounting ring for peripherally surrounding and engaging the tapping. An elongate channel is attached to and extends from the mounting ring such that when the mounting ring is engaged with the tapping, the channel is aligned communicably with the outlet. The channel extends at a downward angle from the outlet such that when the heating element is removed from the tank, water is discharged through the outlet and into the channel. The channel drains such discharged water from the water heater.

In a preferred embodiment, the mounting ring is unitarily connected to the channel. The axis of the ring preferably extends at a positive angle relative to the longitudinal axis of the channel. The channel may have a curved, cross sectional shape. The channel may carry a bracket or retainer for selectively holding a pail or other container. In particular, the retainer may include a pair of aligned notches or similar means formed in the opposing upper edges of the channel. Such notches typically receive the handle of a pail or bucket so that the pail or bucket depends or hangs from the channel when the mounting ring is engaged with the tapping of the water heater. Water discharged from the tank and through the channel spills from the distal end of the channel and collects in the bucket hanging from the channel. After the water has finished draining, it may be disposed of easily and efficiently. After a new heating element is replaced in the water heater, the drain attachment is then removed from the tapping.

One or more frictional gripping elements may be utilized to strengthen the interengagement between the mounting ring and the tapping. Such gripping elements may include serrated fingers or teeth that are interengagable with the circumferential surface of the tapping. In particularly preferred embodiments, when the mounting ring is interengaged with the tapping, the downward leverage exerted upon the mounting ring by the channel increases the frictional interengagement between the gripping element and the tapping. This enables the attachment to be more securely interengaged with the tapping so that more effective draining and water collection are accomplished.

In an alternative preferred embodiment, the mounting ring may include a relatively thin outer circumferential portion and a relatively thick inner circumferential portion. The inner circumferential portion may be snugly interengagable with the tapping of the water heater outlet for holding the drain attachment onto the tapping during use of the attachment.

The channel may include a first channel section that is unitarily connected to the mounting ring and that extends axially substantially parallel to the axis of the mounting ring. The channel may further include a second channel section that is attached unitarily to a distal end of the first channel section and that extends longitudinally therefrom at a negative or downward angle.

DETAILED DESCRIPTION OF PREFERRED EMBODIMENTS

Other objects, features and advantages will occur from the following description of a preferred embodiment and the accompanying drawings, in which.

Figure 1:
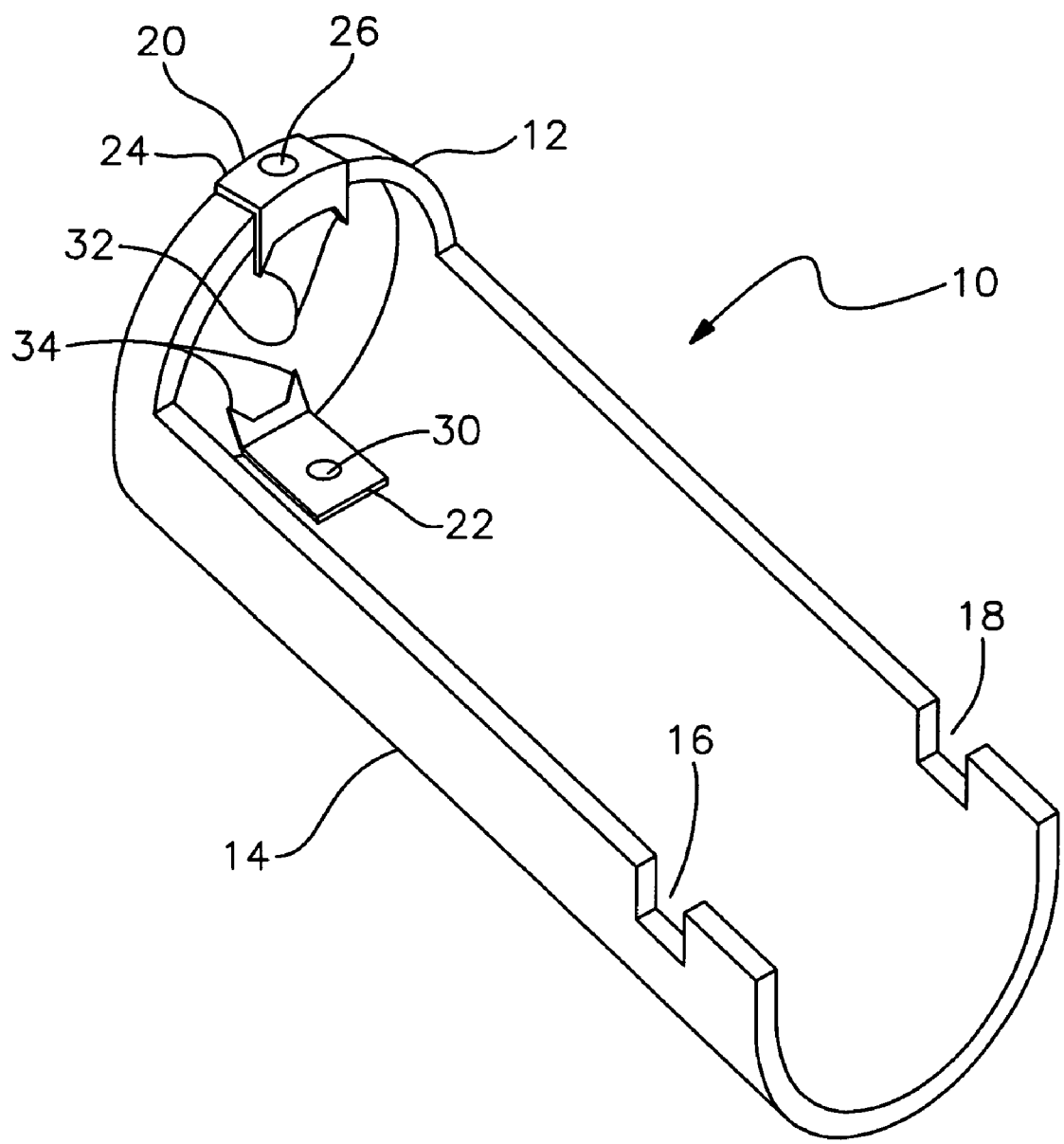
FIG. 1 is a perspective view of a drain attachment for use in changing the heating element of a water heater in accordance with this invention.
Figure 2:
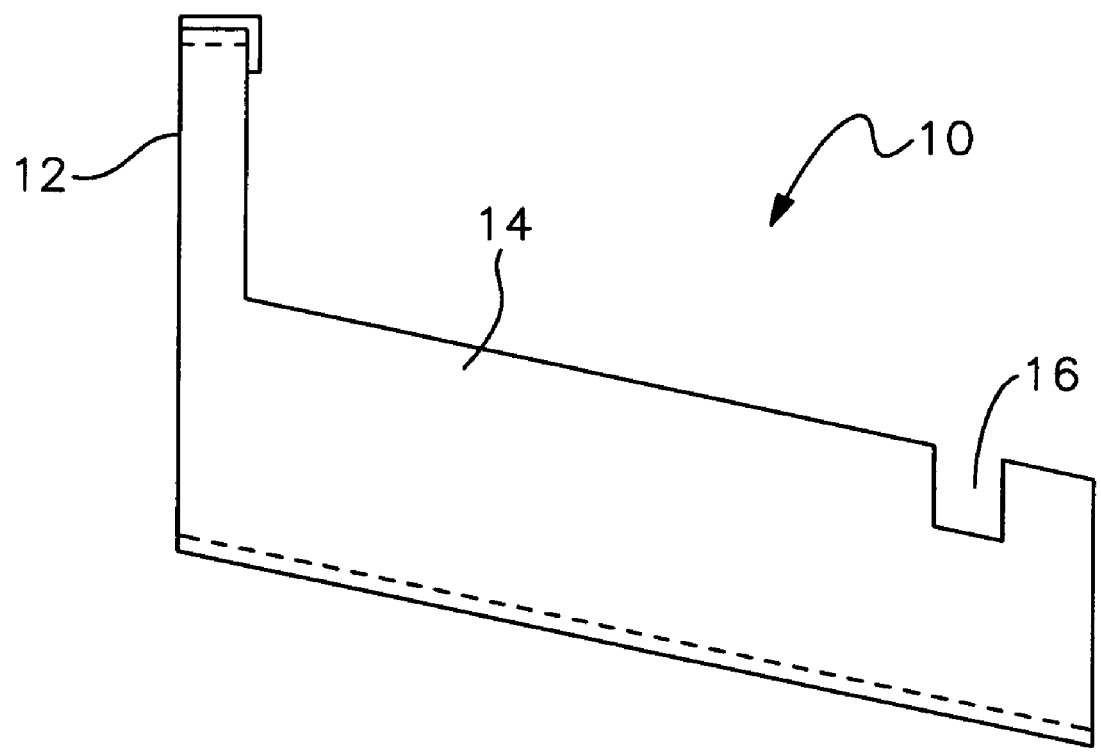
FIG. 2 is a side elevational view of the drain attachment.

There is shown in FIGS. 1 and 2 a drain attachment or tool 10 that is selectively attached to the heating element receptacle or outlet of a standard water heater to facilitate draining water from the water heater tank when the heating element is changed. Tool 10 may be employed effectively with virtually all types of water heaters, including those having either recessed or flush mounted heating element receptacles. The particular type of water heater with which tool 10 may be utilized is not a limitation of this invention. Typically, the water heater features a replaceable heating element that is selectively engaged with a threaded receptacle in the tank of the water heater. This receptacle (which is alternatively referred to as "outlet" herein) is surrounded by an annular flange or tapping that extends from the tank and is engaged by tool 10 in a manner described below.

As shown in FIGS. 1 and 2, tool 10 includes a generally annular or ring-shaped mounting portion 12 and an elongate channel portion 14 that is attached unitarily to and extends from mounting portion 12. Preferably, mounting portion 12 and channel 14 are composed of a durable and heat resistant material such as PVC or some other type of molded plastic. Various alternative compositions may be utilized within the scope of this invention. In some versions, the tool may be composed of metals or metal alloys. As best shown in FIG. 2, channel 14 extends axially at a negative angle from the axis of annular mounting member 12. As explained more clearly below, this permits the channel to slope downwardly from the mounting member when the mounting member is operatively attached to the water heater. Water is therefore drained reliably through the channel from the water heater.

Channel 14 has a generally U-shaped cross sectional configuration best depicted in FIG. 1. A pair of aligned notches 16 and 18 are formed in the respective upper side edges of channel 14. These notches form a retainer bracket in the channel for supporting the handle of a bucket or other container. This is likewise illustrated more fully below.

A pair of metallic gripping elements 20 and 22 are secured to an upper end of tool 10. Gripping element 20 includes a base 24 that is secured to an upper portion of mounting member 12 by a rivet 26 or similar means. Lower gripping element 22 includes a base 28 that is secured to the bottom of channel 14 by a rivet 30. Base 20 of gripping element 24 carries a pair of sharp fingers 32 that project downwardly. Likewise, base 28 of gripping element 22 includes a pair of sharp fingers or teeth 34 that face upwardly and are generally opposed to downwardly facing fingers 32. The function of gripping elements 22 and 24 is again described more fully below.

Figure 3:
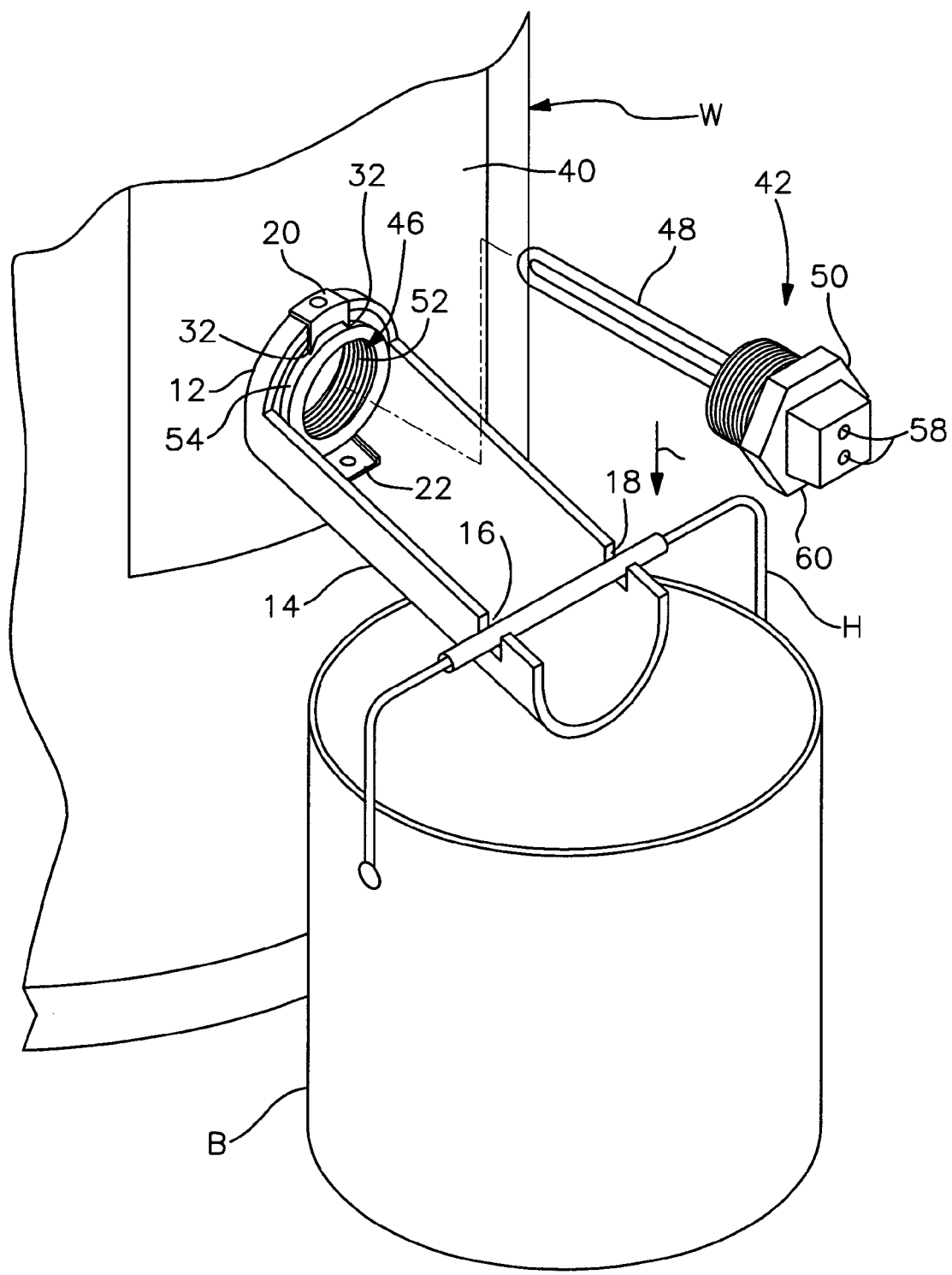
FIG. 3 is a perspective view of the drain attachment mounted to a water heater and being utilized in accordance with this invention.
Figure 4:
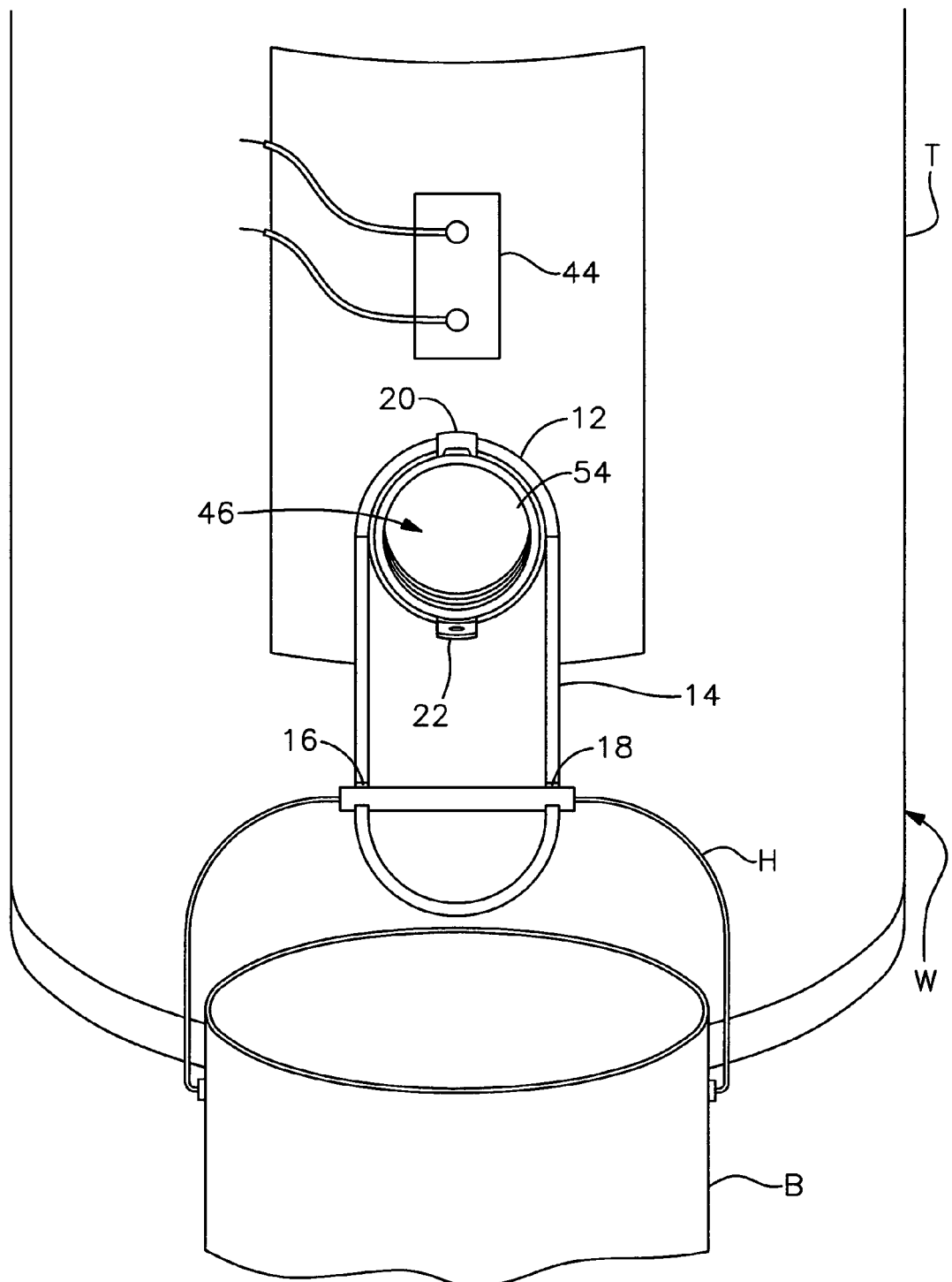
FIG. 4 is a front elevational view of the drain attachment as mounted to the tapping of the water heater.

Tool 10 is utilized to facilitate changing of the heating element of a water heater in the manner shown in FIGS. 3 and 4. Water heater W includes a generally cylindrical tank T. The water heater tank includes a service compartment 40 which, during normal operation of the water heater, is covered by a removable access panel (not shown). In FIGS. 3 and 4, the access panel has already been removed in a standard manner. Compartment 40 accommodates the replaceable heating element 42, as well as associated electrical components 44 and related wiring 45. Once again, the heating element and related electrical components of the water heater are conventional items that do not comprise a part of this invention. In FIG. 3, heating element 42 is depicted as removed from its threaded receptacle 46 within compartment 40. The heating element includes a heating rod 48 and a threaded shank 50 that is threadably interengagable with the threads 52 of receptacle 46. An annular metal flange or tapping 54 peripherally surrounds receptacle 46. In the version shown herein, the receptacle 46 is more or less flush mounted in tank T such that tapping 54 extends outwardly from the outer surface of the tank. In alternative versions, the heating element receptacle may be recessed within a compartment within the tank. As used herein, "compartment" should be simply understood to refer to the region wherein the heating element receptacle and the electrical components associated with the heating element are placed on the water heater. The term tapping refers to any type or shape of flange or other structure surrounding the heating element receptacle.

When heating element 42 needs to be changed, tool 10 is utilized in the following manner in order to facilitate draining of the tank and to prevent the messy leakage of water from receptacle 46. Preliminarily, heating element 42 is received by receptacle 52 and is thereby attached to the water heater. Replacement of element 42 is normally required because heating rod 48 is completely or at least partially defective and the water in the tank is being inadequately heated by the heating element. Initially, the plumber, homeowner or other person performing the work shuts off the electric power to water heater W. Next, the cold water supply to the water heater is shut off and a hot water faucet connected to the water heater is opened. This relieves pressure within tank T. When the pressure is so relieved, all connected faucets are securely closed for the remainder of the operation.

The plumber or other repair person next removes the access cover from tank T and pulls back the insulation which normally covers the components within compartment 40. The standard plastic terminal protector is removed and the wiring is disengaged from terminals 58 of heating element 42. A conventional heating element wrench is engaged with nut 60 of heating element 42. The wrench is then turned to at least loosen the heating element within the threaded receptacle 46. Before the heating element is removed completely from the receptacle, tool 10 is attached by engaging mounting portion 12 about annular tapping 54. The mounting portion of tool 10 should have an inner circumference that is slightly larger than outer circumference of tapping 54. This allows the tapping to be inserted through the mounting member with a fairly close tolerance between those respective components. As tool 10 is attached, the person performing the operation pushes downwardly upon channel 14 as indicated by arrow 70, FIG. 3. This causes the teeth or fingers 32 of gripping element 20 to bite into the circumference of tapping 54 proximate an upper portion of the tapping. By the same token, the teeth 34 of lower gripping element 22 bite into the bottom outer circumference of tapping 54. As a result, mounting portion 12 securely engages and grips the tapping. The mounting portion is held by the tapping such that it points in a generally axially horizontal direction. Channel 14 extends outwardly from compartment 40 at a slightly downward or negative angle, which is dictated by the angle formed between the axis of mounting portion 12 and the longitudinal axis of channel 14.

After tool 10 is mounted to the tapping of water heater W in the above described manner, the plumber or other person changing the heating element attaches a pail, bucket or similar type of container B to the attached tool. More particularly, the handle H of bucket B is engaged with the aligned notches 16 and 18 in the channel. This allows the bucket to hang from the channel in the manner as shown in FIGS. 3 and 4.

After tool 10 has been attached to tapping 54 and bucket B has been hung from channel 14, the person changing the heating element completely removes the loosened element 42. This is accomplished by again using the standard heating element wrench. As a result, one or two cups of water drain from the tank through receptacle 46 and into channel 14. This water runs downwardly through the sloped channel and is discharged into bucket B. Eventually, the vacuum created within the tank slows the flow of water. When the discharge of water out of the receptacle 46 has slowed, the person performing the operation inserts a new heating element 42 into the receptacle and tightens that element using the heating element wrench. Tool 10 is removed by simply lifting channel 14 upwardly to disengage mounting member 12 from tapping 54. The gripping fingers 32 and 34 disengage tapping 54 so that the mounting ring 12 slips readily off of tapping 54. The water in the bucket is disposed of using any convenient nearby sink drain or otherwise.

After the heating element is changed and the new element is tightened into the water heater, the plumber or other person performing the heating element replacement performs a few additional operations to make the water heater once again operational. In particular, the repair person first makes sure that the drain valve of the water heater is closed. The cold water supply to the water heater is then reopened. A hot water faucet is opened to allow air trapped in the water heater to escape until a constant flow is reestablished through the faucet. The hot water faucet is then closed. At this point, the plumber or other person performing the heating element replacement checks to ensure that no leakage is occurring through the heating element receptacle. If there is leakage, the heating element should be retightened or the gasket on the new element should be repositioned. The electrical wiring is then reconnected and the access panel is reattached over service compartment 40. After these steps have been completed, electrical power to the heating element is reestablished.

In alternative embodiments, the elongate channel may feature a downward angle or bend formed between the ends of the channel. In such versions, the channel includes a first segment that extends perpendicularly from the mounting ring. A second distal channel segment bends downwardly from the first segment. This enables the attachment to fit into a more compact space. This version also tends to avoid interference with the water heater case.

Figure 5:
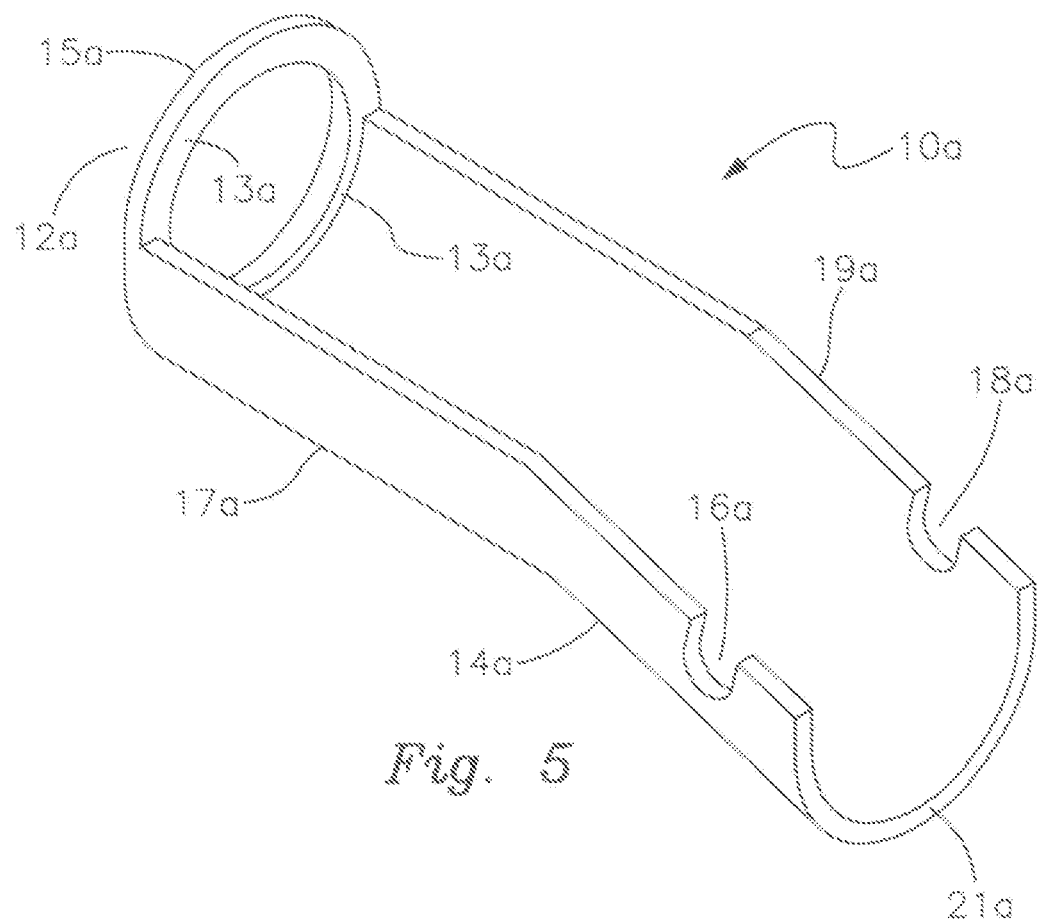
FIG. 5 is a perspective view of an alternative preferred drain attachment in accordance with this invention.
Figure 6:
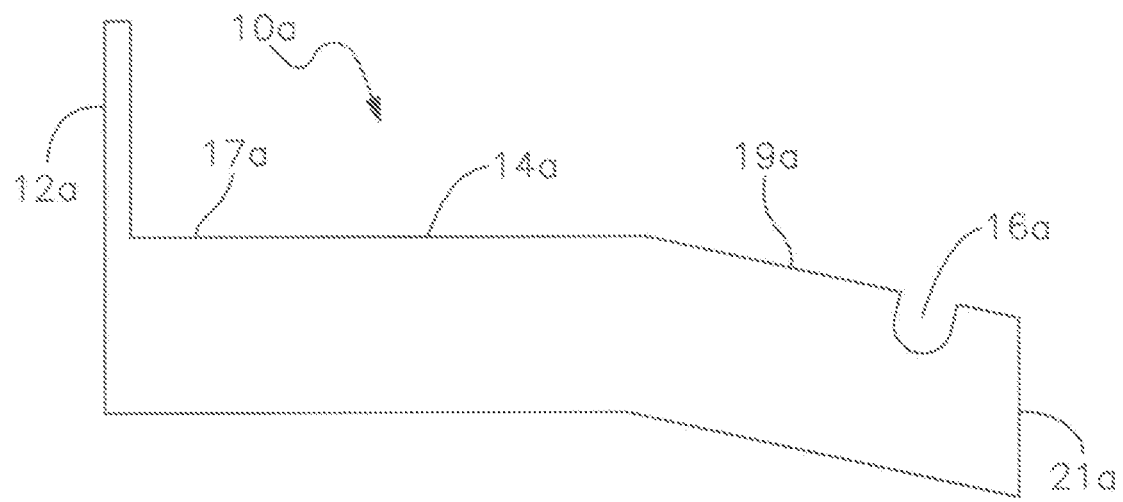
FIG. 6 is a side elevational view of the drain attachment of FIG. 5.

An alternative preferred tool 10*a* is depicted in FIGS. 5 and 6. Once again, the tool features a molded one-piece construction. Preferably, PVC or an alternative heat resistant plastic is employed. Metals or metal alloys may also be utilized. An annular or ring-shaped mounting portion 12*a* is unitarily attached to an elongate channel 14*a*.

Mounting ring 12*a* includes an inner end section 13*a* and an outer end section 15*a*, which are joined integrally and unitarily. These end sections are preferably formed by the mold normally utilized to manufacture the tool. Typically, inner end section 13*a* is thicker or wider than outer end section 15*a*. As a result, the mounting ring 12*a* is better able to snugly engage and grip the water heater tapping. This enables the tool 10*a* to snugly and securely grip the tapping so that the need for circumferential teeth is eliminated. In still other embodiments, various other constructions and elements may be utilized to facilitate gripping of the tapping by the mounting portion of the tool. For example, a series of radial teeth or fingers may extend inwardly from the inner circumference of the mounting portion. In still other versions, an annular flange may be formed about the inner end surface of the mounting portion for extending radially outwardly therefrom. This flange is engagable with the water heater when the mounting ring is engaged with the tapping so that the tool is held more securely in place against the water heater. Various other means may be utilized for securely engaging the mounting portion with the tapping within the scope of this invention.

In the version shown in FIGS. 5 and 6, channel 14*a* again includes a generally U-shaped cross section. However, unlike the previously described embodiment, in this version channel 14*a* includes an inner segment 17*a* that extends perpendicularly from mounting portion 12*a*. Segment 17*a* is axially parallel to the axis of annular mounting portion 12*a*. A second, angled channel segment 19*a* is unitarily attached to the distal end of channel segment 17*a*. Channel segment 19*a* extends at a downward or negative angle from segment 17*a* such that water drained from the water heater is directed downwardly to the distal end 21*a* of channel 14*a*. Once again, a pair of notches 16*a* and 18*a* are formed proximate the distal end 21*a* of tool 10*a*. This allows a pail or bucket to be hung from the tool by simply engaging the handle of the bucket with notches 16*a* and 18*a*.

In operation, the version shown in FIGS. 5 and 6 functions analogously to the previously described version. Tool 10*a* is attached to the tapping of the water heater by engaging annular mounting portion 12*a* peripherally about the tapping. The heating element is removed and water from the water heater tank drains into channel 14*a*. This water is then directed to the pail or bucket hung on tool 10*a*. Benefits analogous to those previously described are thereby achieved.

Tool 10, 10*a* enables a heating element to be replaced more quickly, conveniently and efficiently. The plumber of other repair person does not have to tediously drain the entire tank to perform the replacement. By the same token, the tool virtually eliminates any water leakage, mess or clean-up requirement. Sponges and towels do not have to be jammed into a recessed heating element compartment. The tool is particularly effective for use with either sealed or open water heater element receptacles and greatly reduces the clean-up, inconvenience and mess normally associated with draining water out of such receptacles during replacement of the heating element.

From the foregoing it may be seen that the apparatus of this invention provides for an appliance that is removably attached to the tapping of an electric water heater for diverting or draining water that is discharged when the heating element is removed from the water heater tank. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A drain tool for an electric water heater having a tank with an outlet formed therein for receiving a replaceable heating element, which outlet is surrounded by a tapping having an outer circumferential surface said tool comprising:
    an annular molded plastic mounting ring having an inner circumferential surface for peripherally surrounding and gripping the outer circumferential surface of the tapping; and
    a single elongate molded plastic channel attached unitarily to and extending from a bottom half of said annular mounting ring such that when said mounting ring grips the tapping, said channel is aligned communicably with the outlet and at least a portion of said channel extends in a downward angle from the outlet whereby removing the heating element from the water tank causes water to be discharged from the tank through the outlet and said channel drains such discharged water from the water heater, said channel having a generally U-shaped, semi-annular cross sectional configuration for providing access to the heating element through the tapping and permitting removal and replacement of the heating element through the tapping.

2. The tool of claim 1 in which said ring includes an axis that extends at a positive angle relative to the longitudinal axis of said channel.

3. The tool of claim 1 in which said channel includes a pair of upper longitudinal edges, each edge having a notch formed therein, said notches being aligned for receiving the handle of a bucket such that the bucket hangs from the channel when the mounting portion is engaged with the tapping of the water heater tank.

4. The tool of claim 1 in which said mounting portion ring carries at least one frictional gripping element for interengaging the tapping.

5. The tool of claim 4 in which said gripping element includes inwardly pointing teeth for interengaging the circumferential surface of the tapping.

6. The tool of claim 1 in which said channel includes a first channel segment attached to and extending from said mounting portion such that the axis of said mounting ring is substantially parallel to the axis of the first channel segment, said channel including a second channel segment that is attached to a distal end of said first channel segment and that extends in a downward angle therefrom when said mounting ring is engaged with the tapping of a water heater tank.

7. The tool of claim 1 in which said mounting ring includes a relatively thin outer end portion and a relatively thick inner end portion for surrounding, engaging and gripping the tapping.

8. The tool of claim 1 in which said channel includes a upper edges that are spaced uniformly apart for the entire length of said channel and an interior surface that is exposed for substantially the entire length of said channel.

\* \* \* \* \*